United States Patent
Rawson, III

(10) Patent No.: US 7,788,461 B2
(45) Date of Patent: Aug. 31, 2010

(54) SYSTEM AND METHOD FOR RECLAIMING ALLOCATED MEMORY TO REDUCE POWER IN A DATA PROCESSING SYSTEM

(75) Inventor: Freeman Leigh Rawson, III, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1814 days.

(21) Appl. No.: 10/825,143

(22) Filed: Apr. 15, 2004

(65) Prior Publication Data

US 2005/0232192 A1    Oct. 20, 2005

(51) Int. Cl.
*G06F 13/00* (2006.01)
*G06F 1/26* (2006.01)
*G11C 5/14* (2006.01)

(52) U.S. Cl. .................. 711/170; 365/226; 713/300

(58) Field of Classification Search .............. 711/170; 370/329; 713/300, 321, 323, 310, 320, 324, 713/340; 365/226, 227, 228, 229; 702/60, 702/61, 62, 63
See application file for complete search history.

(56) References Cited

U.S. PATENT DOCUMENTS

2004/0111596 A1 * 6/2004 Rawson, III ............... 713/1
2004/0260957 A1 * 12/2004 Jeddeloh et al. ............ 713/300

OTHER PUBLICATIONS

Abali et al., Memory Expansion Technology (MXT): Software support and performance, IBM Journal of Research & Development, Mar. 2001, vol. 45, No. 2.
Waldspurger, Memory Resource Management in VMware ESX Server, VMware, Inc., Palo Alto, CA.
Barham et al., Xen and the Art of Virtualization, University of Cambridge Computer Laboratory, SOSP'03 Oct. 19-22, 2003, Bolton Landing, New York.

* cited by examiner

*Primary Examiner*—Matt Kim
*Assistant Examiner*—Chery Mardochee
(74) *Attorney, Agent, or Firm*—Dillon & Yudell LLP

(57) ABSTRACT

A method of managing power in a data processing system includes monitoring a system parameter indicative of power consumption. Responsive to determining that the parameter differs from a specified threshold, a system guest, such as an operating system, is forced to release a portion of its allocated system memory. The portion of system memory released by the guest is then reclaimed by the system. The reclaimed system memory and the resulting decrease in allocated memory may enable the system to reduce system memory power consumption. The operating system may de-allocate a portion of system memory when a balloon code device driver executing under the operating system requests the operating system to allocate memory to it. The system memory allocated to the balloon device driver is then reclaimed by supervisory code such as a hypervisor.

8 Claims, 3 Drawing Sheets

SYSTEM AND METHOD FOR RECLAIMING ALLOCATED MEMORY TO REDUCE POWER IN A DATA PROCESSING SYSTEM

BACKGROUND

1. Field of the Present Invention

The present invention is in the field of data processing systems and more particularly in the field of conserving power in data processing systems.

2. History of Related Art

Historically, power consumption and operating temperature in data processing systems have been subordinate to system performance (i.e., speed) as design considerations. More specifically, these parameters were largely considered significant only in terms of the extent to which they constrained system design and prevented the system from achieving its performance goals. Increasingly, however, power consumption and temperature concerns are becoming as important to customers as computing power. Simultaneously, server machines have evolved from more-or-less statically partitioned boxes to fully virtualized systems in which a single physical box, including the system memory, processors, and computing resources, can be allocated to virtualized machines as the customer desires. Virtualization facilitates server consolidation, which is a desirable objective for many customers.

Because system memory is a significant consumer of power and producer of heat in data processing systems, it would be desirable to implement power management techniques able to manage system memory power consumption. In a virtualized server system, it would be still further desirable if the ability to manage system memory power consumption "spanned" the virtual systems that comprise the server.

SUMMARY OF THE INVENTION

The objective identified above is addressed by a method of managing power in a data processing system including monitoring a system parameter indicative of power consumption. Responsive to determining that the parameter differs from a specified threshold, a system guest, such as an operating system, is forced to release a portion of its allocated system memory. The portion of system memory released by the guest is then reclaimed by the system. The reclaimed system memory and the resulting decrease in allocated memory may enable the system to reduce system memory power consumption. The guest operating system may de-allocate a portion of system memory when a balloon code device driver executing under the operating system requests the operating system to allocate memory to it. The system memory allocated to the balloon device driver is then reclaimed by supervisory code such as a Hypervisor.

In a fully virtualized machine embodiment, the invention encompasses a data processing system that includes a plurality of operating system images, a Hypervisor to manage memory allocation among the operating system images, and monitoring facilities to determine that system memory power consumption differs from a desired level. When system memory power reduction is indicated, a memory controller consumes allocated memory by causing at least one of the operating systems to de-allocate or "page out" a portion of its allocated system memory. The memory controller code preferably determines a total amount of system memory to be consumed and allocates the total amount among the operating systems. In one implementation, the memory controller code preferably allocates the total amount of system memory to be consumed to each operating system based, at least in part, on the total amount of system memory allocated to the operating system and the relative activity level associated with the operating system such that more memory is consumed from operating systems having more allocated memory and less activity than from operating systems having less allocated memory and higher activity. Memory consumption is preferably achieved using memory consumer device drivers associated with each operating system. The memory controller code invokes the memory consumer device within each operating system to allocate system memory. Each memory consumer device driver then informs the Hypervisor of its page allocations and the Hypervisor then reclaims each of the pages. The memory controller may include the ability to compact the allocated system memory into a minimal number of separately powerable physical memory sections so that it may then be possible to power down any separately powerable physical memory section containing no allocated memory pages.

The invention further encompasses computer software including code for monitoring an indicator of system memory power consumption, code for detecting a variance between the monitored indicator and a desired value, code for consuming system memory when necessary or desirable as well as code for releasing system memory to the operating systems when the power indicators permit it and performance parameters warrant it. In one implementation, when the code detects a variance between an emergency value and the monitored indicator, the code then consumes system memory regardless of the value of other system performance parameters. If the code detects a variance between a second value (e.g., a warning value) and the monitored indicator, the code may consume system memory depending upon the value of system performance parameters (i.e., if performance is currently above a minimum acceptable value). In addition, if the code detects a variance between a third value and the monitored indicator the code may release memory if a system performance parameter warrants it (i.e., if the power parameters are acceptable but performance is low).

BRIEF DESCRIPTION OF THE DRAWINGS

Other objects and advantages of the invention will become apparent upon reading the following detailed description and upon reference to the accompanying drawings in which.

Figure 1:
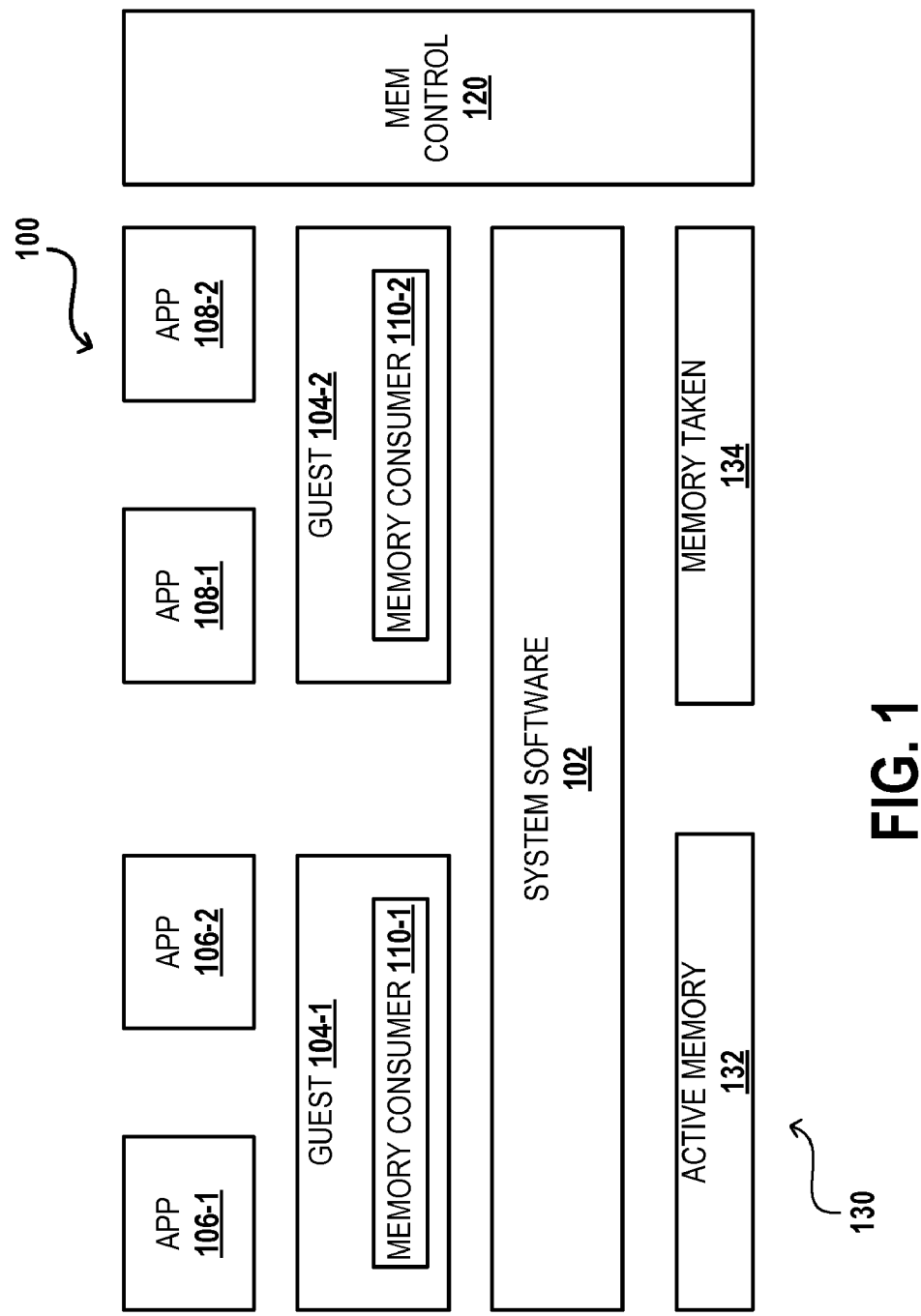
FIG. 1 is a block diagram of selected elements of a generalized data processing system implementing one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

The present invention is generally comprised of a system and method for managing system memory allocation in a way that is designed to emphasize power consumption as a primary memory allocation consideration. Likely implemented in a virtualized server system, the invention will, from time to time, monitor certain environmental parameters of the system such as the system temperature and power dissipation. If the monitored parameters indicate a need for reducing power consumption, the invention invokes a procedure that is specifically designed to acquire or consume system memory. In the process of responding to the memory consumer procedure, the guest is forced to de-allocate system memory from other applications. The memory consumer then reclaims this de-allocated system memory for the system. In this manner, the memory consumer has the net effect of reducing the amount of system memory that is allocated.

Following this memory consumption, memory compaction techniques may be employed to pack the allocated system memory in a manner that minimizes the number of separately powerable sections of system memory to which memory is allocated. If consumption and compaction result in a section of physical memory that is entirely both separately powerable and free (de-allocated), that section of memory may then be powered down to reduce power consumption.

Alternatively, environmental monitoring in conjunction with performance considerations may cause the memory consumer to give unallocated system memory back to the guests and their applications. Performance considerations may include application progress, the paging rates of the guests, and the overall I/O rate of the system. If power considerations permit it and performance considerations warrant it, the invention may return memory to its normal operating state and release it to the guest systems for their use.

In one embodiment, a "ballooning" technique is employed by the memory consumer. After monitoring the environmental parameters and determining the memory consumption is justified or necessary, the memory consumer invokes ballooning code that is likely in the form of a device driver within each guest operating system that is resident on the server. The ballooning device driver makes memory allocation requests to its operating system for the express purpose of forcing it to "page out" or otherwise de-allocate memory pages that are allocated to other applications.

Similarly, when the system needs to return memory to a guest, after putting the memory in the appropriate power state, it invokes the guest's memory consumer to reduce its memory consumption by releasing memory that it previously consumed. The guest can then allocate the memory as it needs to improve the performance of applications.

Figure 2:
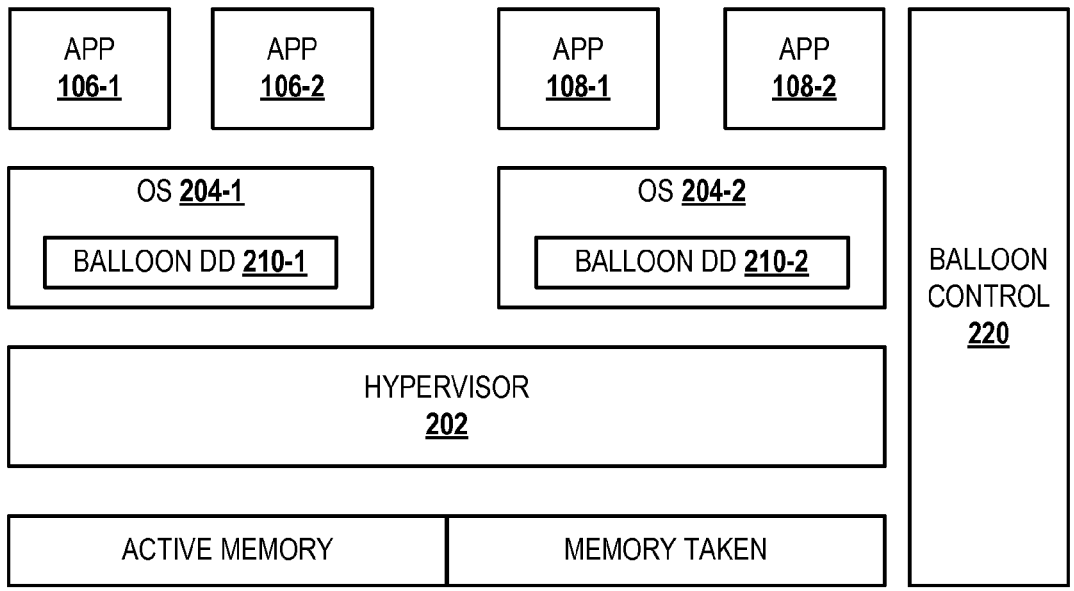
FIG. 2 is a diagram of a fully virtualized implementation of the data processing system of FIG. 1 according to one embodiment of the invention.
Figure 3:
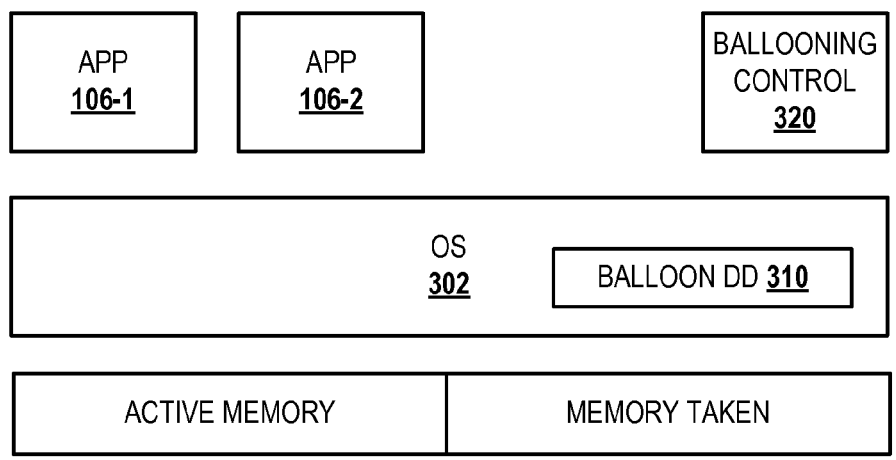
FIG. 3 is a single-operating system implementation of the data processing system of FIG. 1 according to one embodiment of the invention.

Referring now to the drawings, FIGS. 1 through 3 illustrate selected elements of a data processing system according to different embodiments of the invention. FIG. 1 illustrates a generalized server implementation. FIG. 2 is a specific implementation of FIG. 1 for a virtualized server including two or more virtualized systems, each running its own operating system. FIG. 3 illustrates a case in which a server is running just a single operating system. The relationship between the various pieces of code that comprise the system is somewhat influenced by the implementation, but the generalized case (FIG. 1) emphasizes the elements that are common to each implementation while FIG. 2 and FIG. 3 illustrate details of their respective implementations.

In FIG. 1, selected elements of a generalized data processing system 100 incorporating the present invention are shown. System 100 is likely a server system that may or may not be partitioned along either physical or virtual boundaries. Portions of the invention may be implemented as computer executable code (software) that is stored on a computer readable medium such as a hard disk, CD, DVD, floppy disk, or other persistent storage device. During execution, portions of the computer code may also be stored in volatile storage such as the system memory or an external or internal cache memory.

FIG. 1 emphasizes the system's software elements and includes system software 102, one or more guests 104-1 and 104-2 (collectively or generically referred to as guest(s) 104), each of which is shown as including a corresponding memory consumer 110-1 and 110-2 (generically or collectively referred to as memory consumer(s) 110), and a set of applications 106-1, 106-2, 108-1 and 108-2. System software 102 represents code that resides directly on the system hardware. FIG. 1 also shows physical memory 130 divided into two sections. One portion 132 is active while another portion 134 has been taken, is inactive and is potentially in a low-power state. In a fully virtualized machine as depicted in FIG. 2, system software 102 of FIG. 1 is implemented as a Hypervisor 202. Hypervisor 202 is code that controls system memory allocation across multiple operating system images. In a non-virtualized or non-partitioned machine as depicted in FIG. 3, the system software 102 of FIG. 1 is an operating system 302.

The guests 104 of FIG. 1 represent code that runs on top of system software 102. In the virtualized embodiment depicted in FIG. 2, the guests 104-1 and 104-2 of FIG. 1 represent operating systems 204-1 and 204-2 of FIG. 2. In the context of the non-partitioned system shown in FIG. 3, the operating system 302 and the guest are the same. The applications 106 and 108 of FIG. 1 represent applications that are executing under their respective operating system(s).

In the virtualized embodiment of FIG. 2, the memory consumers 110 of FIG. 1 are implemented as ballooning device drivers 210-1 and 210-2 that execute within the context of operating systems 204-1 and 204-2 respectively. The memory consumer controller 120 of FIG. 1 is implemented as balloon controller 220 of FIG. 2. Balloon controller 220 is configured to invoke ballooning device drivers 210 to "force" their respective operating systems to consume allocated memory pages. As used in this disclosure, the concept of consuming memory or consuming memory pages refers to a technique in which the number of allocated memory pages is reduced. Reduction of allocated memory pages results from using the ballooning device driver 210 to consume memory pages that the respective operating system 204 has allocated to an application program 106 or 108. Analogously, the ballooning device driver 310 of FIG. 3 is invoked by a ballooning controller 320 to execute within the context of operating system 302 to consume memory pages allocated to applications 106.

The ballooning device drivers 210 (FIG. 2) and 310 (FIG. 3) may be implemented using portions of balloon code from VMware, Inc., as described, for example, in Waldspurger, *Memory Resource Management in VMware ESX Server* (VMware, Inc. 2003). In this implementation, ballooning device drivers 210 and 310 are loaded into their respective operating systems. Ballooning device drivers 210 and 310 act, from the guest's perspective, as ordinary device drivers. Balloon controllers 220 or 320 use device-like interfaces to control the drivers. However, ballooning device drivers 210 and 310 do not control any actual hardware devices, but instead, are used exclusively to allocate and release memory. When balloon controller 220 or 320 determines that it is desirable or necessary to reduce system memory power consumption, it loads and executes balloon device drivers 210 and 310 to allocate system memory pages using methods that are native to the corresponding operating system 204 or 304. In the context of FIG. 2, device driver 210 notifies Hypervisor 202 of its page allocations thereby allowing Hypervisor 202 to reclaim the pages on behalf of the system. In the context of FIG. 3, device driver 310 notifies operating system 302 that it has consumed the required number of pages. It should be noted that the portion of the operating system notified of this is, in general, a different component than the standard memory logic. When it has consumed sufficient memory pages, device driver 210 or 310 informs the system software, which then "steals" the pages from the guest and makes them available for power management.

By configuring balloon device drivers 210 and 310 to use native methods to consume memory pages, the invention leverages the operating system's decision-making intelligence to determine, for example, which memory pages are most desirable to page out when balloon device driver 210 or 310 is executed or which applications need memory when pages are released. Moreover, the use of balloon device drivers as an external stimulus to the guest operating systems beneficially avoids the need for modifying the guest operating systems, for which source code is generally difficult to obtain.

Balloon controllers 220 and 320, according to the present invention, employ aggressive ballooning as a memory usage and power management technique. By periodically checking parameters such as system memory power consumption and system temperature and taking memory consumption action if the monitored parameters warrant such action, the invention throttles system memory power and reduces the "spread" of used and allocated regions across the memory hardware. By concentrating the allocated system memory, the invention enables greater use of power management techniques that are only very coarsely granulated. As an example, memory devices, such a dual-inline memory modules (DIMMs), which may be separately or selectively powered are generally quite large relative to the granularity (page size) of memory pages defined by the operating system and/or system software. Since the physical memory occupied and allocated by an operating system or a virtualizing hypervisor is not even approximately contiguous, opportunities for powering down an entire DIMM may be quite rare in the absence of a mechanism for consuming allocated memory.

Power management actions may also be taken when power and temperature conditions are below critical levels if the overall load on the system does not justify the amount of memory currently at full power. In this case, the controllers cause the consumers to consume memory so that it may be power-managed to reduce overall operating cost and system stress. Performance monitoring relevant to this procedure may include monitoring of parameters such as application progress rates, I/O activity, and paging rates. When system load goes up or when the power and temperature drop sufficiently, the balloon controllers react by "deflating" the balloons thereby causing the memory consumers to release memory, which is then powered up and returned to the guests.

Figure 4:
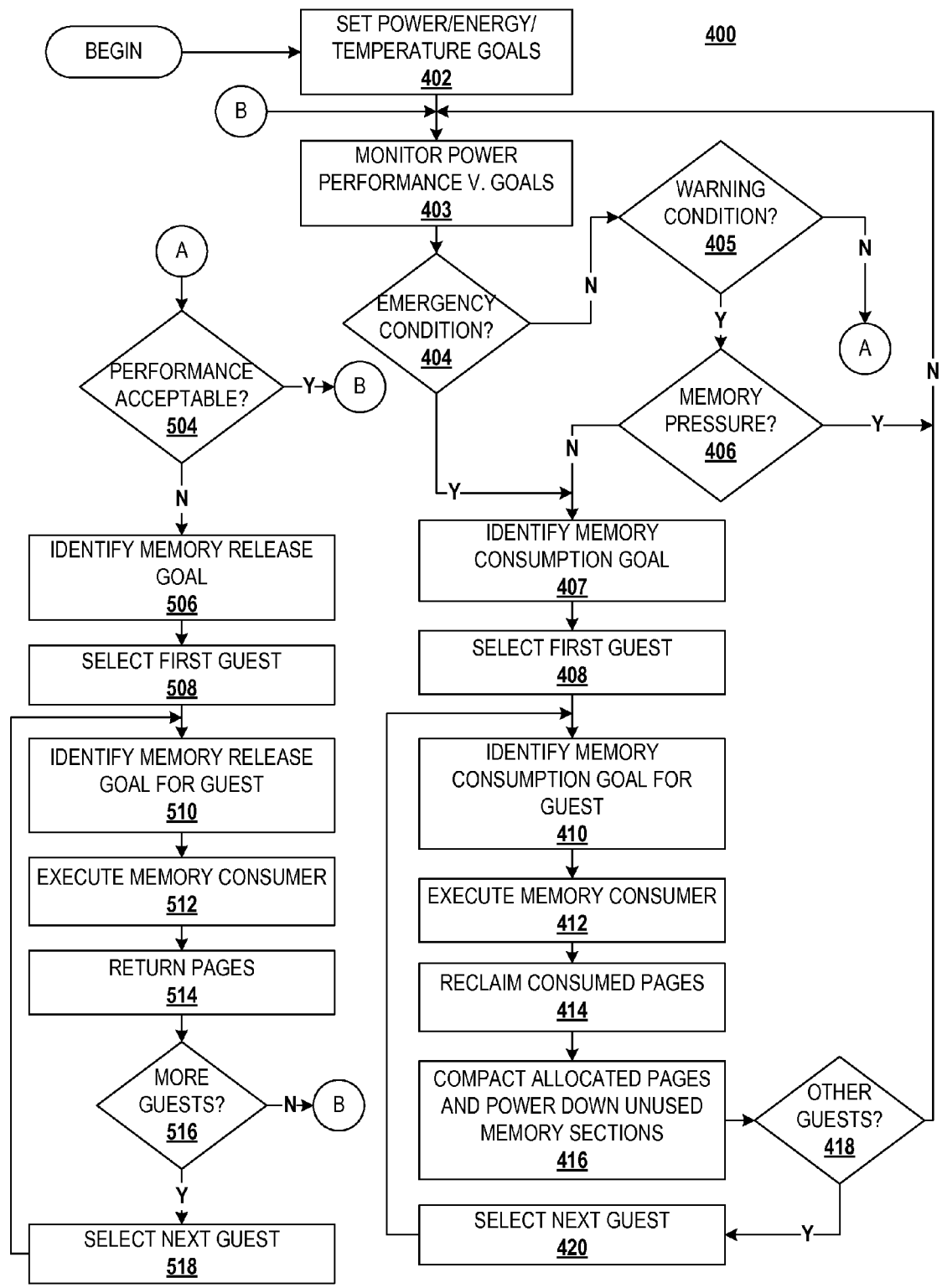
FIG. 4 is a flow diagram illustrating a method of controlling system memory power consumption in a data processing system according to one embodiment of the invention.

Referring now to FIG. 4, a flow diagram depicting a method 400 of using a memory consumer to conserve energy used by and reduce the operating temperature of a data processing system according to one embodiment of the invention is shown. In the illustrated embodiment, method 400 includes an initialization process (block 402) in which goals are set for selected operating parameters of the data processing system. In the depicted embodiment, the operating parameters for which goals are set include the energy and power consumed by the system and the operating temperature of the system.

The operating goals established in block 402 may include a first set of goals that indicate "emergency" conditions and a second set of goals that may be characterized as "warning" conditions. The emergency conditions may indicate limits of operating parameter(s) beyond which continued operation represents a threat to the integrity of the system and/or the system's operation. The warning conditions indicate less dire conditions that may be used to initiate corrective action assuming that other system objectives are being met.

As an example, the emergency conditions may include an operating temperature above which continued operation is not warranted by the system's manufacturer. In such cases, corrective memory consuming action according to the present invention is initiated unconditionally. The system may respond to a warning condition by taking memory consuming action if other systems parameters are currently at acceptable levels. Thus, the second set of conditions may include a warning temperature. If the system temperature exceeds the warning temperature (but is less than the emergency temperature), memory-consuming activity may occur if other conditions, such as system performance or latency, are within a desired range.

In addition to the emergency and warning conditions used to determine when to consume memory, method 400 implements still a third set of conditions to determine when it may be desirable to release system memory back to the guests for allocation to their respective application programs. Using this third set of conditions, system memory might be released to the guests when the power parameters such as system temperature are acceptable, but performance is poor as indicated, for example, by low throughput or high response latency.

The manner in which an appropriate set of emergency conditions, warning conditions, and release conditions are established is an implementation detail. Empirical data may be used to determine the appropriate limits for each system. The goals may be selectable under software control by a system administrator or other user.

Method 400 as illustrated in FIG. 4 is an implementation that is suitable for use in a fully virtualized server system, such as the system depicted in FIG. 2. In this implementation, the memory consuming corrective action taken by the system is managed at the system level. Specifically, the performance goals are established as system-wide goals that are monitored and enforced across operating system boundaries. In this manner, the invention avoids potential conflicts that might exist among the various operating systems residing on the system and obviates the need to modify any of the operating systems.

Once the system's goals and corresponding limits have been established, method 400 enters a theoretically endless loop in which the system's current state is compared to the established goals in a prioritized order, to determine whether memory consuming or memory releasing activity is warranted. Thus, in block 403, method 400 monitors the system power parameters and compares (block 404) the set of emergency conditions to determine if emergency memory consumption is needed. If emergency conditions are indicated (e.g., a system temperature above a critical value), memory consumption activity is undertaken unconditionally (i.e., regardless of system performance levels).

If emergency conditions are not indicated, the system's state is compared against the set of warning conditions (block 405). If warning conditions are also not indicated, the depicted embodiment of method 400 then jumps to a memory release segment (beginning with block 504 as described below) in which it determines whether it may be appropriate to release memory back to the operating systems. If, on the other hand, the warning conditions are indicated in block 405, method 400 then determines whether the current level of system performance permits or suggests that memory consumption might be undertaken without negative impact. This determination (block 406) is referred to as determining whether the system is currently experiencing memory pressure. Memory pressure is indicated by parameters such as the paging rate and indicates roughly whether the amount of system memory currently allocated to the guests is sufficient to handle the current load. If there is significant memory pressure, memory consumption might then drop system performance below an acceptable level and, therefore, no memory consumption activity is initiated. Instead, method 400 simply returns to its monitoring state in block 403. If memory pressure is acceptably low in block 406, corrective action (i.e., memory consumption) is initiated in an effort to reduce the power parameters even further.

In the depicted embodiment, corrective action is taken for each "eligible" guest operating systems. In a likely implementation, every operating system image is eligible for memory consuming activity. In other implementations, however, it may be desirable to exempt one or more operating systems from any memory consuming activity. If, for example, one of the operating systems was associated with a service level agreement (SLA) warranting a specified level service, that operating system might be eliminated as an eligible operating system.

When memory consumption is indicated by either the emergency or warning conditions, corrective action is taken on a guest-by-guest basis. Initially, a "global" amount of system memory to be consumed is determined (block 407) by the hypervisor or memory controller code. The determination of a global value of memory to be consumed in block 407 may be subject to competing considerations. As stated previously, for example, multiple sets of system goals may be established including a set of emergency goals/constraints and a set of warning goals/constraints. If the system is consuming memory to address an emergency condition, the amount of memory required to address the condition may also require the memory controller to communicate with the system software (such as the hypervisor) to throttle or otherwise intentionally slow the resident operating systems to avoid a thrashing condition in which the system spends a significant portion of its available resources paging files to and from persistent storage. If, on the other hand, the memory consumer is invoked to address a non-emergency condition, the system software may communicate with the memory controller to determine how much memory may be consumed without adversely or excessively impacting system performance.

Thus, because the memory controller and the memory consumer may increase memory "pressure", memory controller may include a mechanism for receiving input or feedback from system software to optimize the amount of memory to be consumed with an acceptable level of system performance constrained by the power and energy considerations. In non-emergency conditions, for example, the memory controller and system software may approximate memory pressure using paging rate and I/O re-read rate statistics. If these statistics indicate unacceptable levels of performance in the form of excessive latency or paging rates, the memory controller may reduce the quotas for one or more operating systems thereby allowing the operating systems to re-claim system memory space.

After the global amount of system memory to be consumed is determined, each guest is then selected (block 408) and a memory consumption goal the selected guest is determined (block 410). In one embodiment desirable for its relative simplicity, a proportional control mechanism is employment based upon two or more characteristics associated with each guest operating system. In a likely embodiment, each guest is evaluated for (1) the amount of memory resources currently allocated and (2) the amount of system "activity" attributable to the guest. Qualitatively, it is desirable if the memory consumer takes memory preferentially from guest operating systems that (1) are associated with a relatively large amount of allocated memory space and (2) account for a relatively low percentage of system activity. Thus, a guest operating system that allocates huge amounts of memory, but does very little actual processing, would likely be required to "give up" a relatively large portion of the memory space needed by the memory consumer. More quantitatively, one implementation of the invention assigns two values to each guest operating system. The first value is indicative of how much allocated memory space is attributable to the guest while the second value is indicative of the amount of activity attributable to the operating system. If, for example, $MF_i$ indicates the "memory fraction" of each guest operating system, where memory fraction refers to the relative amount of system memory allocated by the corresponding operating system, and $AF_i$ indicates the "activity fraction" (the relative amount of system activity attributable to each operating system) and $IF_i$ indicates the "idleness fraction", where $IF_i=1-AF_i$, it follows that.

$$\Sigma_i MF_i = 1 \qquad \text{(Eq. 1)}$$

$$\Sigma_i AF_i = 1 \qquad \text{(Eq. 2)}$$

$$\Sigma_i IF_i = N-1 \qquad \text{(Eq. 3)}$$

where N is the number of (eligible) guest operating systems. Summing Eq. 1 and Eq. 3 and dividing by N yields $$\Sigma_i 1/N(IF_i + MF_i) = 1 \qquad \text{(Eq. 4)}$$

A proportional control mechanism might then determine each guest's "quota" (the amount of allocated memory that each guest needs to give up), denoted as $M_i$, as $$M_i = M_{tot} * (IF_i + MF_i)/N, \qquad \text{(Eq. 5)}$$

where $M_{tot}$ is the total amount of system memory to be freed. In this implementation, each guest's quota reflects the size of each guest (the amount of memory currently occupied by the guest) as well as the amount of activity attributable to the operating system, where relatively large and idle operating systems have higher quotas than relatively small and active operating systems.

The precise algorithm by which the memory controller determines quotas for each resident guest is implementation specific. Other implementations may incorporate algorithms that account for other factors and/or constraints. As an example, whereas the quota approach described above approximates the amount of memory consumption needed to achieve a desired energy/power/thermal goal, other implementations may incorporate an explicit solution of power/energy/thermal constraints during each memory consumption cycle. In this implementation, the memory consumption process proceeds until measured values of the monitored parameters are within their specified targets.

Following the determination of a quota for the guest operating system under consideration, the memory controller executes (block 412) the memory consumer to allocate as fixed in physical memory an amount of memory sufficient to achieve the quota. This allocation effectively "steals" memory that would otherwise remain allocated to other applications. As indicated previously, the memory consumer may be implemented as a balloon device driver (one device driver for each guest operating system) that consumes memory, thus causing the corresponding operating system to page out memory, pages allocated to other applications thereby effectively permitting the system to reclaim (block 414) memory pages that were previously allocated.

Ideally, the memory consumer appears to the operating system as any other memory requesting application. Specifically, the implemented memory consumer preferably causes the corresponding operating system to allocate memory to the memory consumer (and thereby de-allocate memory from other applications) in the same manner that the operating system would allocate memory pages to any requesting application. This approach beneficially maintains the decision making authority for determining which memory pages to swap out with the operating system, which is presumably the entity that is best able to decide how pages should be de-allocated.

After achieving a specific memory consumption quota for a particular guest operating system, the system software and memory controller may take action to reduce system memory power consumption in block 416. In the depicted embodiment of method 400, the type of actions that may be taken to reduce system memory power consumption include causing pages that were consumed to enter a standby or low power mode. Additionally, system software, in conjunction with the guest operating system may compact the allocated memory pages into a hopefully small number of separately powerable memory sections and thereby enable the system to power off one or more of the remaining, unused memory sections. Memory compaction, for purposes of this disclosure, refers to the process of reassigning virtual memory pages to occupy a more contiguous region of physical memory.

As determined by blocks 418 and 420, method 400 executes the memory consumption sequence of blocks 410 through 416 for each eligible operating system resident on the system. When the memory consumption quota established for each operating system has been achieved, the current memory consumption cycle terminates and the system returns to normal operation. After some predetermined interval, the system begins the process again by monitoring the performance and goals in block 404. In this manner, the system periodically checks itself to verify compliance with a set of energy related performance goals and, if the goals are not being met, the system attempts to reduce system memory power consumption.

When neither the emergency nor warning conditions are indicated in blocks 404 and 405, method 400 jumps to a memory release segment beginning with a determination (block 504) of whether system performance (e.g., latency) is currently acceptable. If system performance is acceptable, there is no need to release system memory back to the guests and method 400 returns to its monitoring state of block 403. If performance is not acceptable, method 400 performs a memory release sequence (block 506 through 518) that is roughly analogous to the memory consumption sequence of blocks 407 through 420. Specifically, a global memory release goal is established in block 506 by the memory controller. A guest is then selected (block 508) and a memory release value specific to that guest is established (block 510). The memory release target for each guest likely depends on the same parameters that governed the memory consumption considerations in block 410 described above. Memory is then released (block 512) by the memory controller and the released pages are returned to the operating system (block 514). As indicated by blocks 516 and 518, the sequence of block 508 through 514 is then repeated for each of the operating systems before returning the system to its monitoring state in block 403.

Thus, it will be apparent to those skilled in the art having the benefit of this disclosure that the present invention contemplates a system and method for monitoring and reducing system memory energy consumption in a data processing system. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of managing power in a data processing system, comprising:
   monitoring a system parameter indicative of power consumption;
   responsive to determining that the parameter is greater than a specified first threshold, causing a guest of the system to de-allocate a portion of system memory allocated by the guest by causing an operating system of the system to de-allocate said portion of system memory by invoking a balloon code device driver of said operating system to request memory, wherein said balloon code device driver requests said operating system to allocate memory to said balloon code device driver; and
   reclaiming by a hypervisor the portion of system memory requested by said balloon code device driver and, responsive thereto, reducing system memory power consumption.

2. The method as claimed in claim 1, wherein said system parameter includes system temperature.

3. The method as claimed in claim 1, wherein said system parameter includes system power consumption.

4. The method as claimed in claim 1, wherein reducing system power consumption comprises powering down said portion of system memory reclaimed by said hypervisor.

5. The method as claimed in claim 1, further comprising:
   in response to determining that said parameter is less than said specified first threshold, determining if said parameter is greater than a specified second threshold.

6. The method as claimed in claim 5, further comprising:
   in response to determining that said parameter is greater than said specified second threshold, determining if said portion of system memory allocated by said guest is sufficient to handle a current load; and,
   in response to determining that said portion of system memory allocated by said guest is sufficient to handle said current load, invoking said balloon code device driver to request said operating system to allocate memory to said balloon code device driver.

7. The method as claimed in claim 5, further comprising:
   in response to determining that said parameter is less than said specified second threshold, determining if system performance is unacceptable; and,
   if said system performance is unacceptable, invoking said balloon code device driver to release memory allocated to said balloon code device driver.

8. The method as claimed in claim 1, wherein reducing system power consumption comprises:
   compacting allocated pages; and,
   powering down said portion of system memory reclaimed by said hypervisor.

* * * * *